Dec. 22, 1959 L. M. LLORENS 2,917,995
DIFFERENTIAL TYPE SETTING MEANS IN CALCULATING MACHINE
Original Filed July 29, 1950 10 Sheets-Sheet 1

FRONT END

INVENTOR.
Louis M. Llorens
BY
Dale A. Bauer
ATTORNEY.

Dec. 22, 1959   L. M. LLORENS   2,917,995
DIFFERENTIAL TYPE SETTING MEANS IN CALCULATING MACHINE
Original Filed July 29, 1950   10 Sheets-Sheet 2
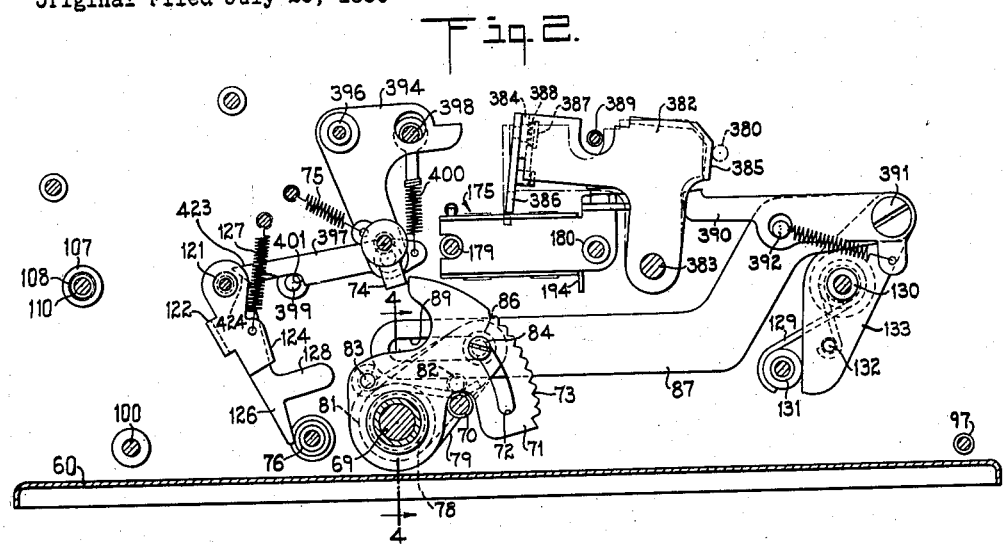
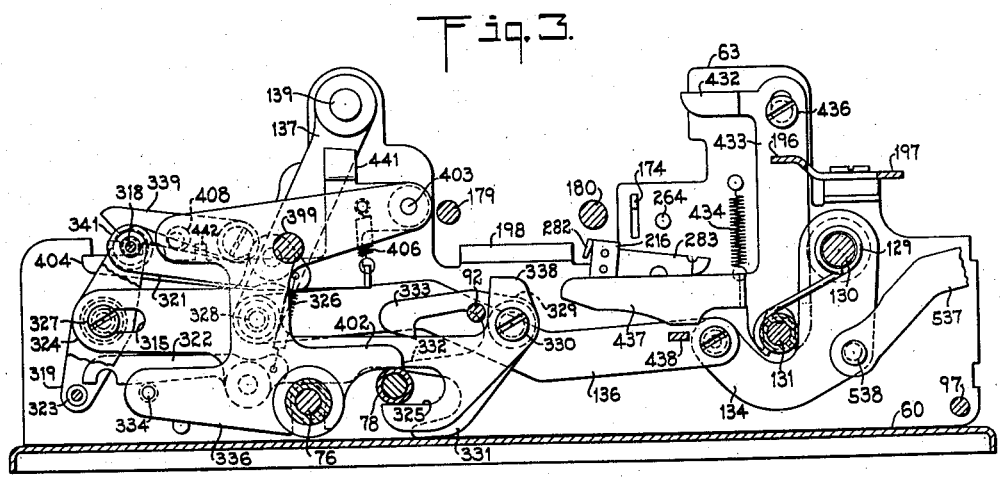
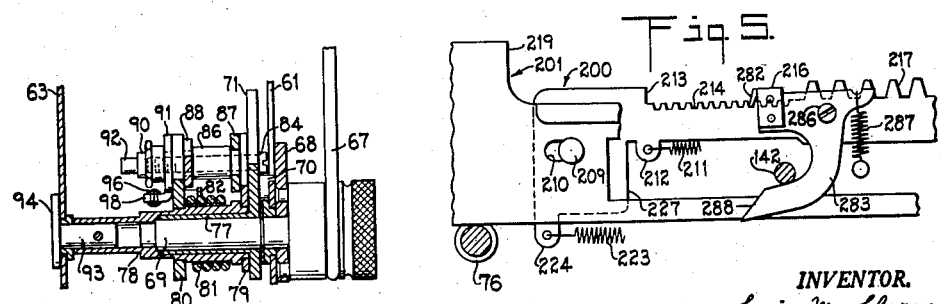
INVENTOR.
Louis M. Llorens
BY
Dale A. Sauer
ATTORNEY.

Dec. 22, 1959 L. M. LLORENS 2,917,995
DIFFERENTIAL TYPE SETTING MEANS IN CALCULATING MACHINE
Original Filed July 29, 1950 10 Sheets-Sheet 3

INVENTOR.
Louis M. Llorens
BY
Dale A. Bauer
ATTORNEY.

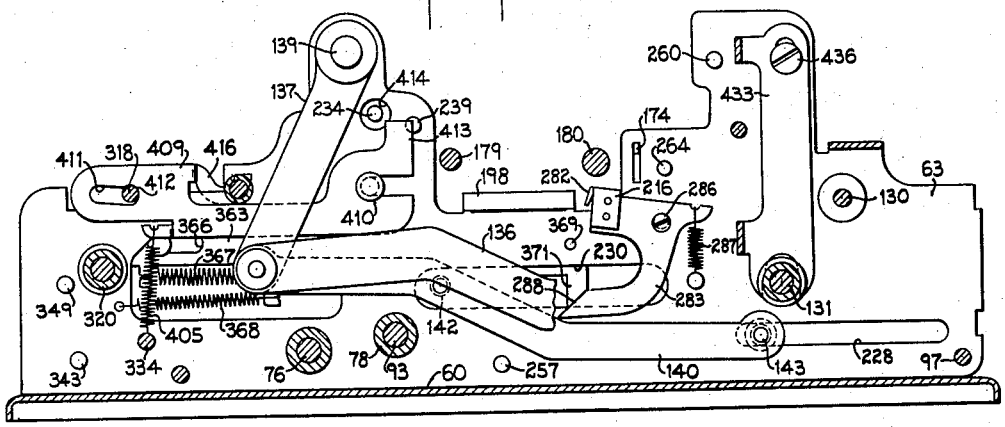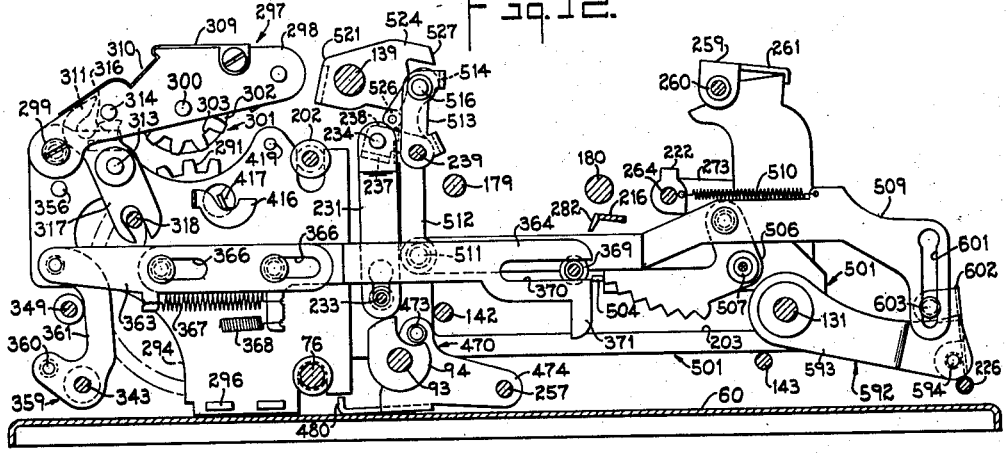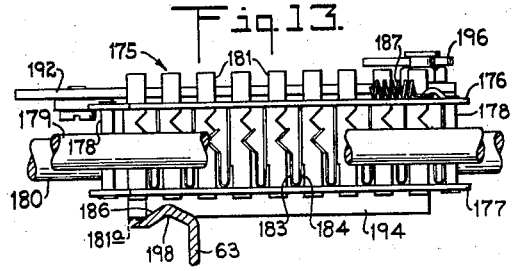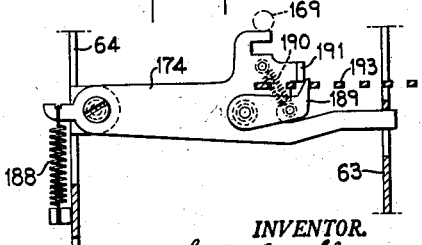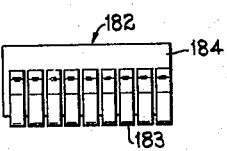

Dec. 22, 1959 L. M. LLORENS 2,917,995
DIFFERENTIAL TYPE SETTING MEANS IN CALCULATING MACHINE
Original Filed July 29, 1950 10 Sheets-Sheet 5
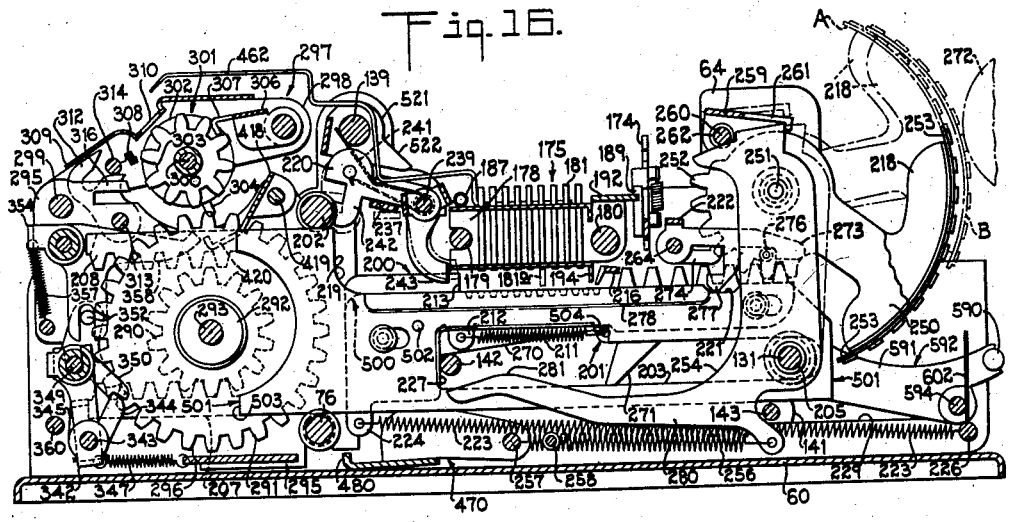
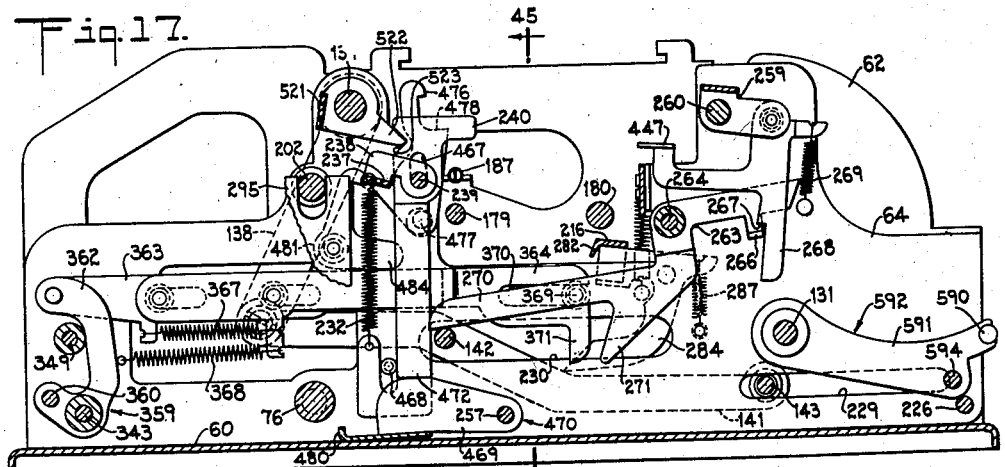
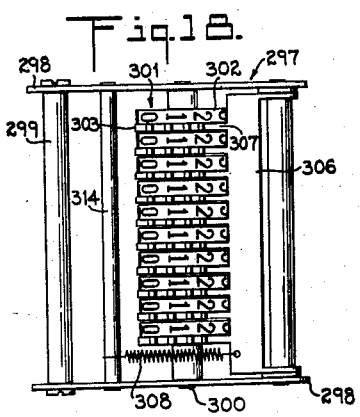
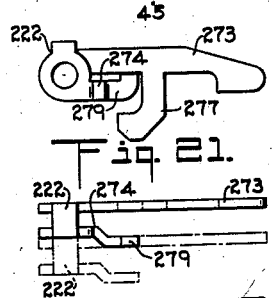
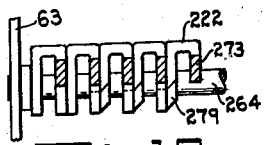
INVENTOR.
Louis M. Llorens
BY
Dale A. Bauer
ATTORNEY.

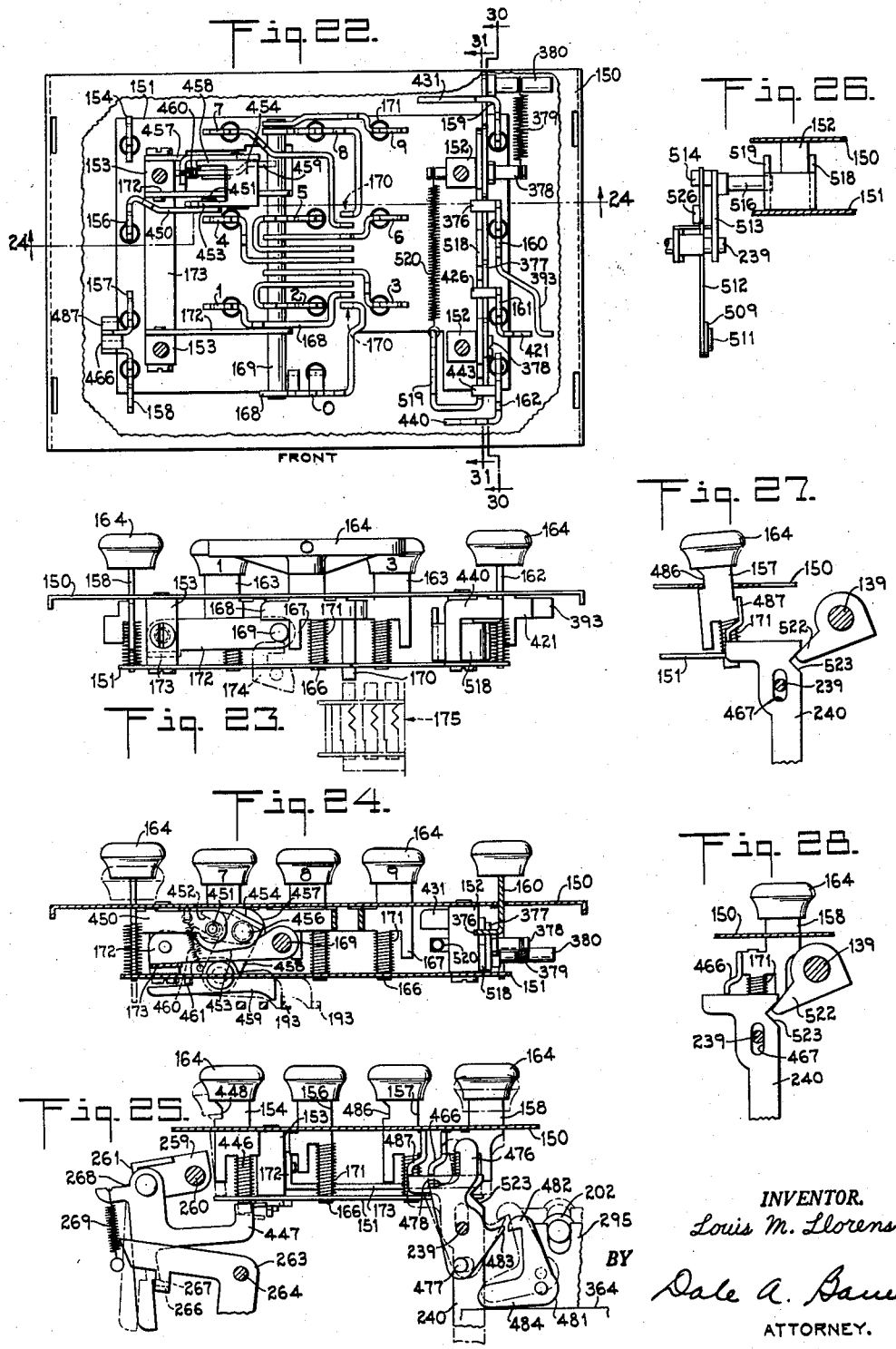

Dec. 22, 1959   L. M. LLORENS   2,917,995
DIFFERENTIAL TYPE SETTING MEANS IN CALCULATING MACHINE
Original Filed July 29, 1950   10 Sheets-Sheet 7
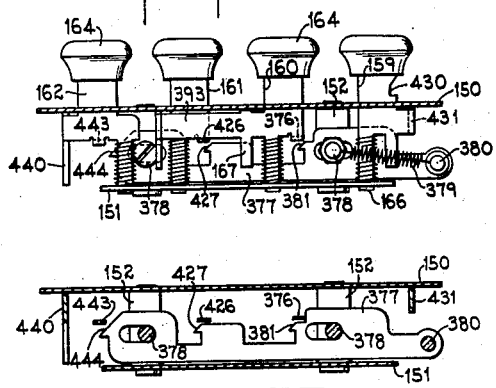
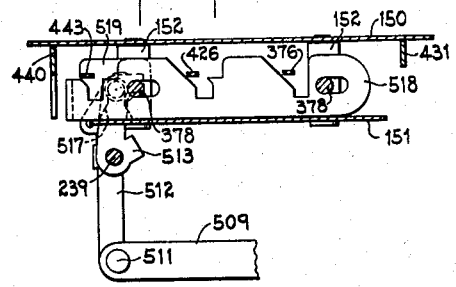
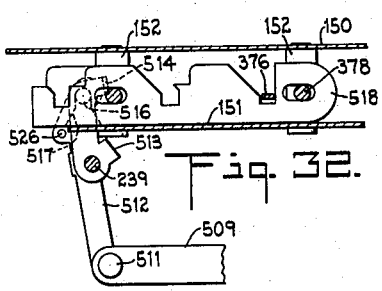
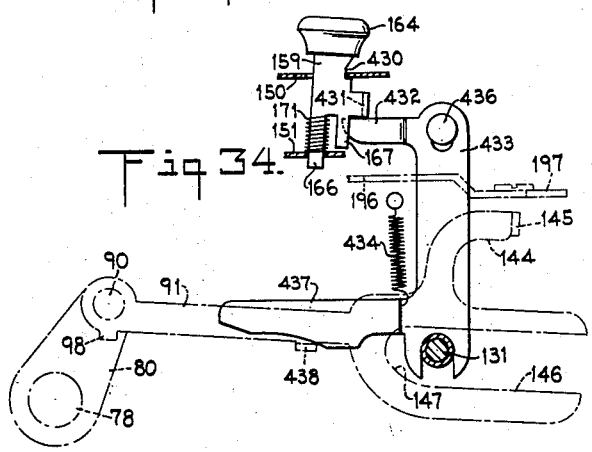
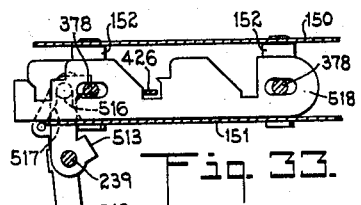
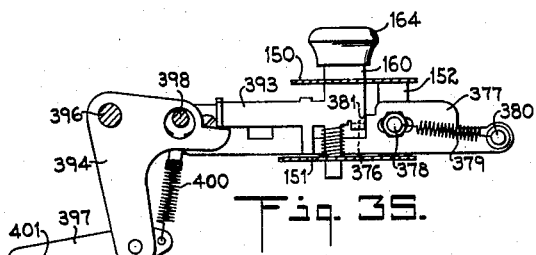
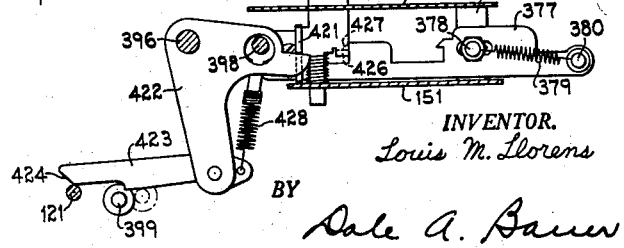
INVENTOR.
Louis M. Llorens
BY
Dale A. Bauer
ATTORNEY.

Dec. 22, 1959 L. M. LLORENS 2,917,995
DIFFERENTIAL TYPE SETTING MEANS IN CALCULATING MACHINE
Original Filed July 29, 1950 10 Sheets-Sheet 8
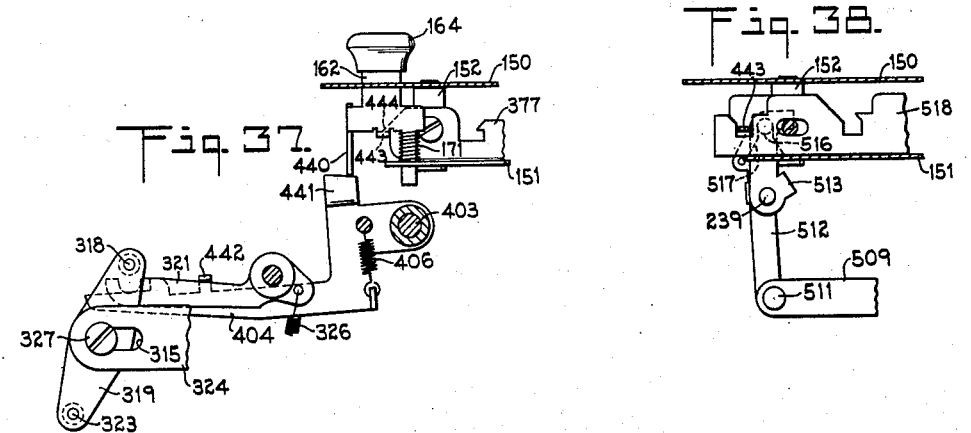
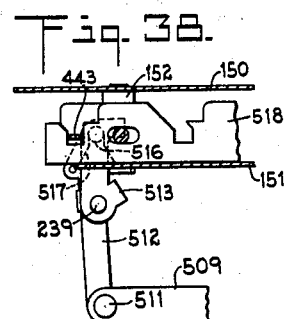
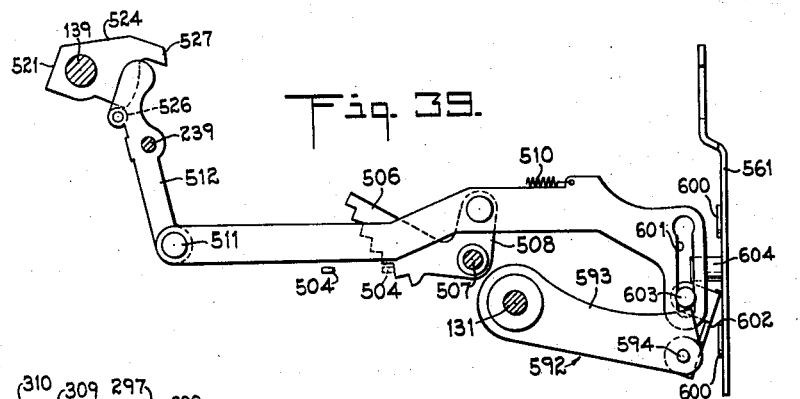
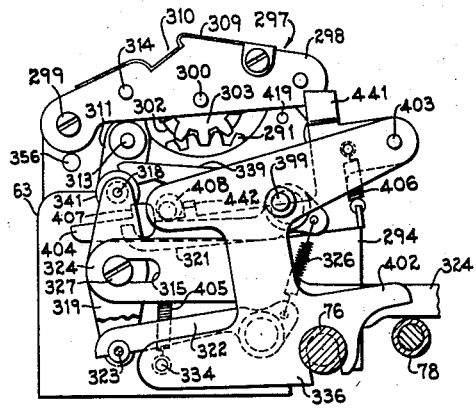
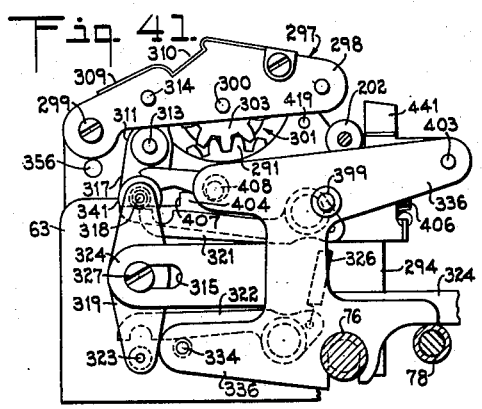
INVENTOR.
Louis M. Llorens
BY
Dale A. Bauer
ATTORNEY.

Dec. 22, 1959 L. M. LLORENS 2,917,995
DIFFERENTIAL TYPE SETTING MEANS IN CALCULATING MACHINE
Original Filed July 29, 1950 10 Sheets-Sheet 9
Fig. 42.
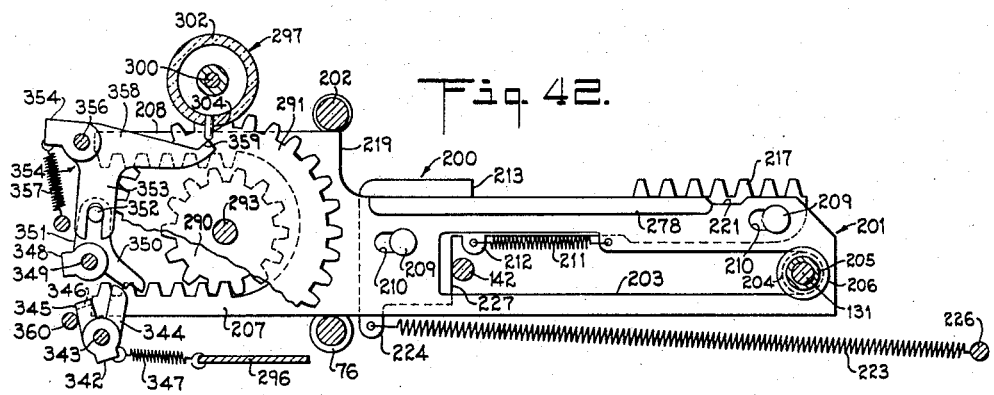
Fig. 43.
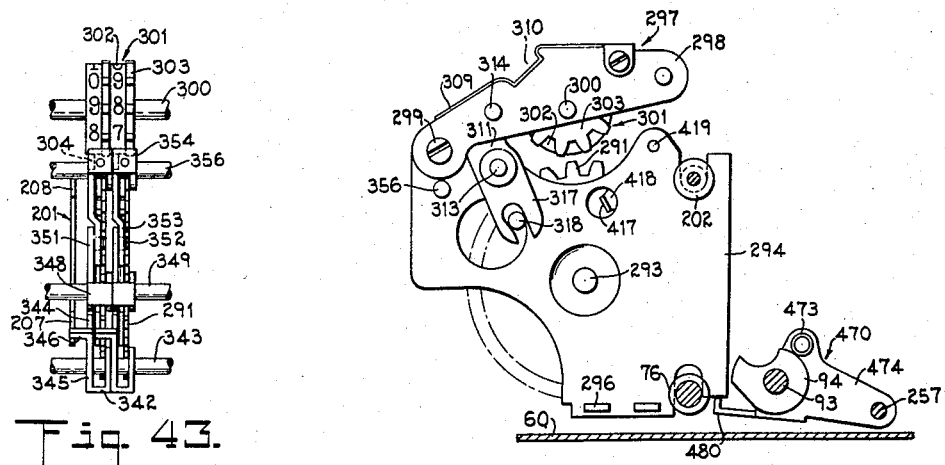
Fig. 44.
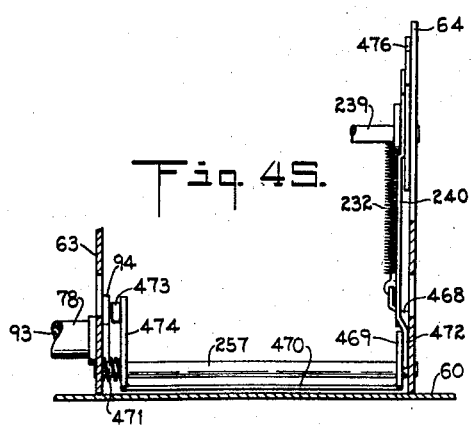
Fig. 45.
INVENTOR.
Louis M. Llorens
BY
Dale A. Bauer
ATTORNEY.

Dec. 22, 1959  L. M. LLORENS  2,917,995
DIFFERENTIAL TYPE SETTING MEANS IN CALCULATING MACHINE
Original Filed July 29, 1950  10 Sheets-Sheet 10
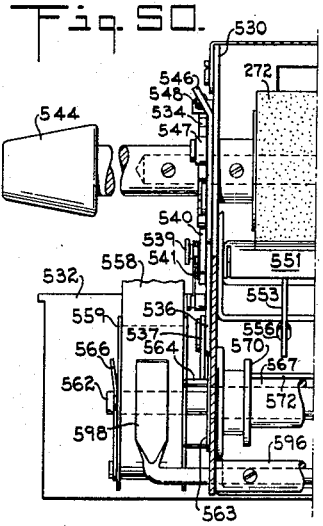
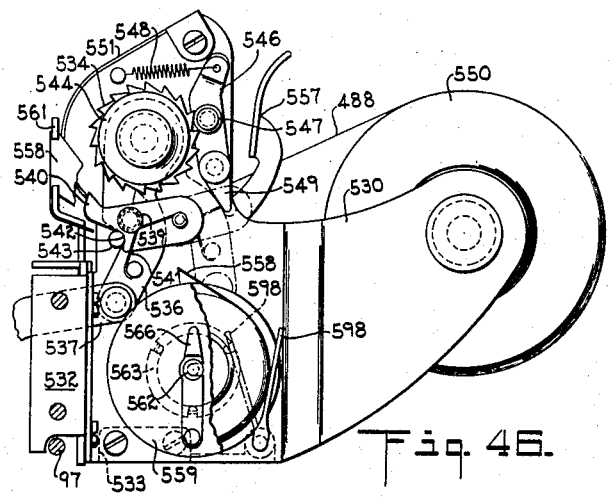
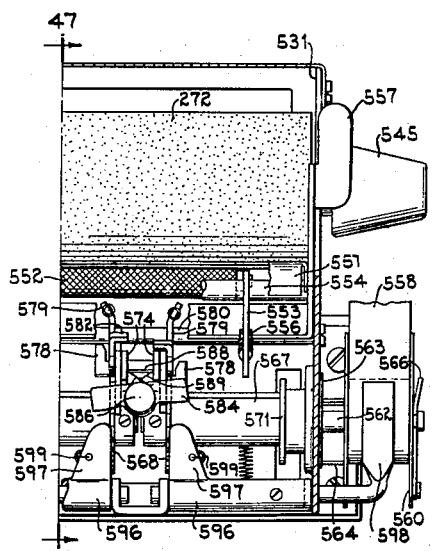
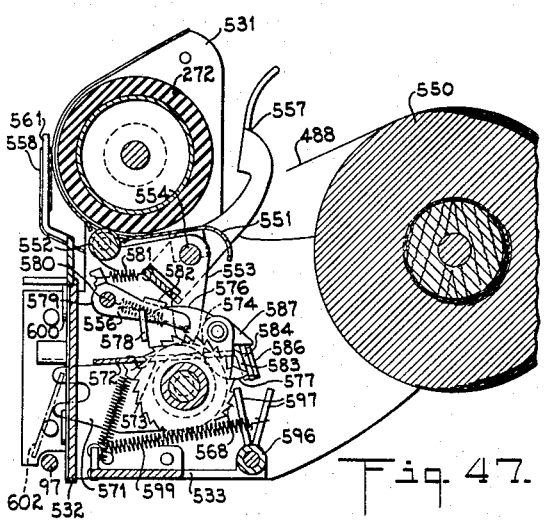
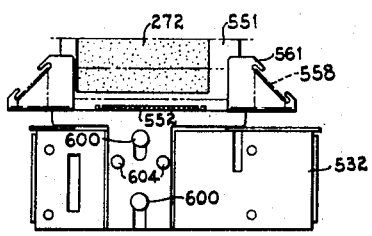
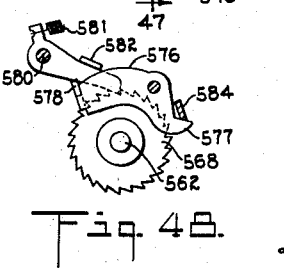
INVENTOR.
Louis M. Llorens
BY
Dale A. Bauer
ATTORNEY.

United States Patent Office 2,917,995
Patented Dec. 22, 1959

2,917,995
DIFFERENTIAL TYPE SETTING MEANS IN CALCULATING MACHINE

Louis M. Llorens, Long Island City, N.Y.

Original application July 29, 1950, Serial No. 176,741. Divided and this application December 6, 1951, Serial No. 260,231

25 Claims. (Cl. 101—93)

This invention relates to calculating apparatus and more particularly to machines adapted to perform a plurality of mathematical operations and including printing and visual totalizing mechanisms.

This application is a division of my application Ser. No. 176,741 filed July 29, 1950, for "Calculating Machine," and the detailed description hereinafter contained is limited primarily to those features of the machine which are claimed herein. For a complete detail description of the entire machine illustrated in the accompanying drawings, reference is had to said application Serial No. 176,741.

One of the objects of the present invention is to provide novel apparatus for making mathematical computations which embodies novelly constructed parts that are so assembled and associated in a novel manner to perform plural functions, whereby the size, weight and total number of parts are reduced considerably below those of known machines capable of performing comparable functions.

Another object is to provide a novel, readily-portable computing machine which is of comparably simple construction, the parts of which may be assembled in an advantageous manner so as to facilitate inspection and repair.

Another object is to provide novel means in calculating apparatus for printing or listing the figures entered into the computing mechanism.

Another object is to provide a novelly constructed computing machine which will perform more mathematical operations mechanically and with less of the personal equation than any known machine of comparable size and simplicity.

Another object is to provide calculating apparatus embodying a novelly constructed printing device of the hammer-blow variety, the type bars thereof being actuated and controlled in a novel manner, and said apparatus also embodying novel means for rendering said printing device ineffective without otherwise interfering with the normal functioning of the apparatus.

Another object is to provide novel means in a calculating machine or the like for effecting the printing of symbols to indicate the nature of the computation or operation performed by the machine.

The above and further objects and novel features of the present invention will more fully appear from the following detail description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views, Fig. 1 is a top plan view of a calculating machine constructed in accordance with the present invention, the outer casing and the keyboard being removed and certain of the parts having portions thereof broken away for purposes of clearer illustration;

Fig. 2 is a vertical longitudinal or side sectional view substantially on the line 2—2 of Fig. 1;

Fig. 3 is a vertical longitudinal sectional view substantially on the line 3—3 of Fig. 1, with the stop-pin carriage omitted;

Fig. 4 is a fragmentary vertical transverse sectional view substantially on the line 4—4 of Fig. 2;

Fig. 5 is a fragmentary detail side elevation view, partly in section, shown the locking comb for the printing quadrant actuating rack in locking position, portions of the associated totalizer actuating slide rack being broken away for purposes of clearer illustration;

Fig. 11 is a vertical longitudinal sectional view, taken substantially on the line 11—11 of Fig. 1;

Fig. 12 is a vertical longitudinal sectional view substantially on the line 12—12 of Fig. 1;

Fig. 13 is an enlarged detail end elevation view, partly in section, of the stop-pin carriage;

Fig. 14 is a detail side elevational view of one of the stop-pin holding springs shown in end elevation in Fig. 13;

Fig. 15 is a detail end elevational view, partly in section, of the stop-pin carriage escapement mechanism;

Fig. 16 is a vertical longitudinal or side sectional view substantially on the line 16—16 of Fig. 1;

Fig. 17 is a vertical longitudinal sectional view taken substantially on the line 17—17 of Fig. 1;

Fig. 18 is a detail top plan view of a portion of the totalizer unit with the cover therefor removed for purposes of clearer illustration;

Fig. 19 is an enlarged detail end elevational view, partly in section, showing a number of the type-quadrant locking members in assembled relation;

Figs. 20 and 21 are enlarged top plan and side elevational views, respectively, of one of said type-quadrant locking members;

Fig. 22 is a detail top plan view of the keyboard unit with the key buttons omitted and a portion of the top plate thereof broken away for purposes of clearer illustration;

Fig. 23 is a front elevation view of said keyboard unit looking from the bottom of Fig. 22, and showing parts of the stop-pin carriage and escapement mechanism in dotted lines;

Fig. 24 is a vertical transverse sectional view on the line 24—24 of Fig. 22, and showing particularly the back-spacer mechanism;

Fig. 25 is a side elevational view, partly in section, of said keyboard unit looking from the left in Fig. 22, and including the elements controlled by the non-print and subtraction keys;

Fig. 26 is a detail front elevational view, partly in section, of the symbol selector slide of the keyboard unit, and including elements operated by said slide;

Fig. 27 is a detail side elevational view, partly in section, showing the division key depressed with associated parts;

Fig. 28 is a detail side elevational view, partly in section, showing the subtraction key depressed with associated parts;

Fig. 29 is a side elevational view, partly in section, of the keyboard looking from the right in Fig. 22, the key lock slide being shown in position to permit depression of the total or sub-total keys;

Fig. 30 is a vertical longitudinal sectional view substantially on the line 30—30 of Fig. 22 showing the key lock slide in normal position to prevent depression of the total and sub-total keys;

Fig. 31 is a vertical longitudinal or side sectional view substantially on the line 31—31 of Fig. 22, the symbol-selector slide and elements associated therewith being shown in normal positions;

Fig. 32 is a view similar to Fig. 31, but showing the position of the parts when printing a total;

Fig. 33 is a view similar to Fig. 31, but showing the position of the parts when printing a sub-total;

Fig. 34 is a detail side elevational view, partly in section, showing the repeat key depressed and the elements actuated thereby;

Fig. 35 is a detail side elevational view, partly in section, showing the total key depressed and locked, and some of the elements actuated thereby;

Fig. 36 is a detail side elevational view, partly in section, showing the sub-total key depressed and locked, and some of the elements actuated thereby;

Fig. 37 is a detail side elevational view, partly in section, showing the non-add key depressed and locked, and some of the elements actuated thereby;

Fig. 38 is a view similar to Fig. 31, but showing the symbol-selector slide and associated elements in position for a non-add operation;

Fig. 39 is a detail side elevational view, partly in section, showing the symbol controlling mechanism and the inked ribbon lifting mechanism, said mechanisms being shown in position for effecting a subtraction operation;

Fig. 40 is a fragmentary side elevational view, partly in section, showing the totalizer and actuating mechanism therefor in the positions occupied when printing a total;

Fig. 41 is a view similar to Fig. 40, but showing the totalizer and actuating mechanism in the positions occupied when printing a sub-total;

Fig. 42 is a detail side elevational view, partly in section, showing particularly the carry-over mechanism in position for effecting a carry-over;

Fig. 43 is a fragmentary front elevational view of the carry-over mechanism, viewed from the left in Fig. 42;

Fig. 44 is a fragmentary side elevational view, partly in section, showing the totalizer and slide rack gear frame unit in raised or subtraction position;

Fig. 45 is a fragmentary vertical transverse sectional view, looking from the right in Figs. 12 and 17, showing the mechanism for controlling the raising of the rack gear frame unit of Fig. 44, the section being taken approximately on line 45—45 of Fig. 17;

Fig. 46 is a side elevational view of the paper and ribbon feed unit or printing platen assembly;

Fig. 47 is a vertical side sectional view of the unit shown in Fig. 46, the section being taken substantially on line 47—47 of Fig. 51;

Fig. 48 is a detail side elevational view, partly in section, of a portion of the ribbon feed mechanism;

Fig. 49 is a fragmentary front elevational view of said unit, on a reduced scale, as viewed from the left in Figs. 46 and 47; and Figs. 50 and 51 are complementary rear elevational views, partly in section and with the paper supply roll removed, Fig. 50 showing elements illustrated in Fig. 46 and Fig. 51 showing elements illustrated in Fig. 47.

The single embodiment of the inventions illustrated in the accompanying drawings, by way of example, is in the form of a manually-operable, readily-portable calculating machine of the so-called ten key type. The machine is capable of effecting direct mechanical addition and subtraction and may be used to readily effect multiplication and division. Means are provided for listing or printing the figures set into the machine as well as identifying marks for indicating the results and the nature of the computations, the printing mechanism being of the so-called hammer-blow type. The illustrated machine also embodies visual totalization or accumulation.

Figure 1:
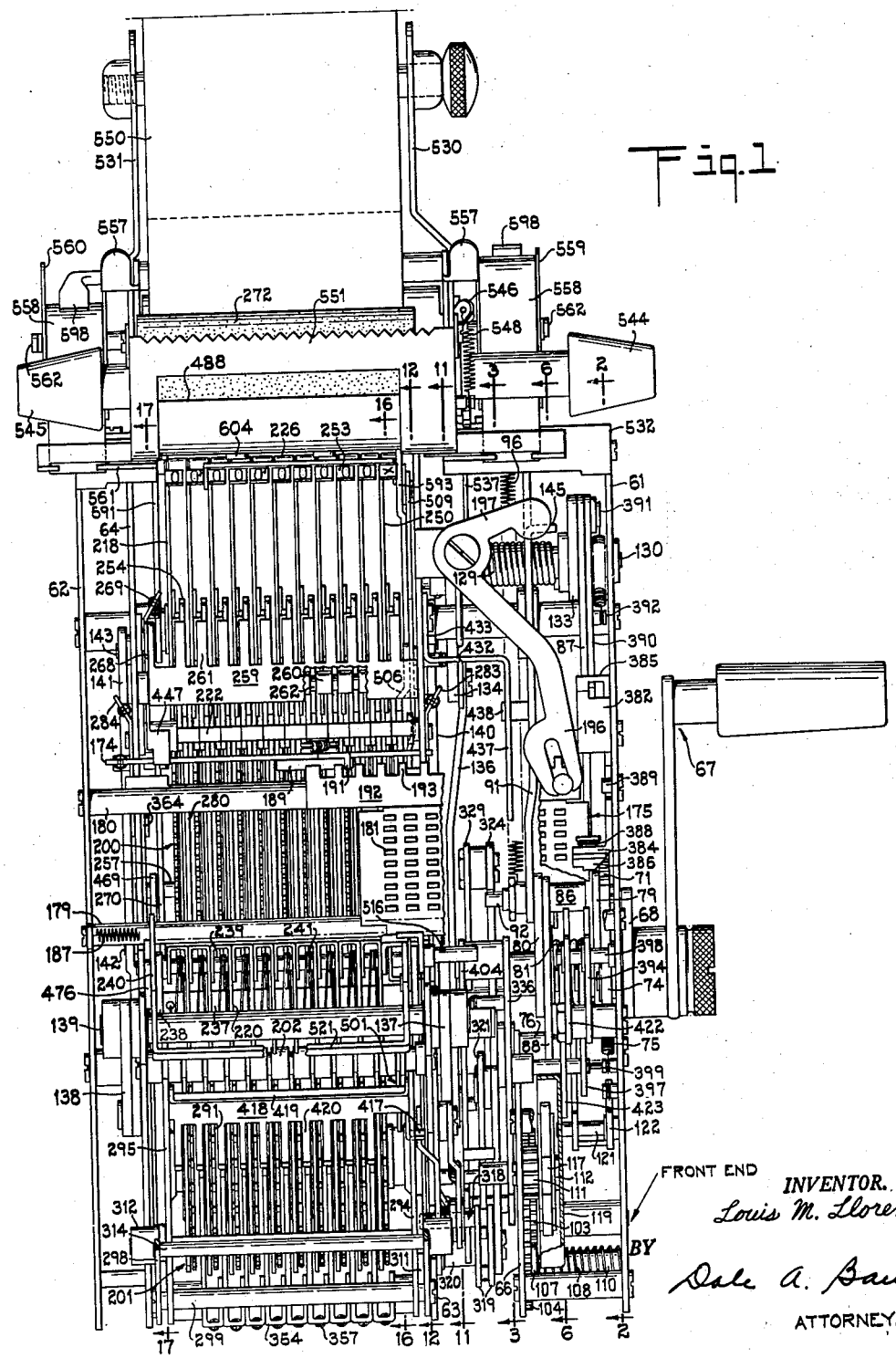

In the form shown, the basic frame or support for the operating parts of the machine comprises a base 60 to which a plurality of upright longitudinally extending frame members or plates are secured in any suitable known manner (Fig. 1). Two outside frame members 61 and 62 serve as supports for various operating and stationary parts. Two inside frame members 63 and 64 serve as supports and are cut away and perforated wherever necessary to accommodate other parts. A shorter vertical frame member 66 is provided at the forward end of the machine between members 61 and 63. These five upright frame members are connected together by a plurality of horizontal tie rods or the like, most of which perform additional functions and will be more specifically identified as the description proceeds.

In the interest of brevity and uniformity the end of the machine nearest the operator, i.e. the end at the bottom in Fig. 1, is herein treated as and called the "front" of the machine, whereas the end remote from the operator is referred to as the "rear" of the machine. The terms forward movement and rearward movement are used to identify movements toward the front and rear of the machine, respectively. Unless otherwise stated, the terms clockwise and counter-clockwise are used to identify movements of pivoted parts when viewed along their axes from the front, top or right hand side as viewed in Fig. 1, and the terms right-hand and left-hand are used to identify movements of parts or directions as viewed from the right or the front in Fig. 1.

*Basic driving or power input mechanism*

(Figs. 1, 2, 4 and 6 to 9)

The invention contemplates novel simplified means embodying only a small number of compactly assembled parts for imparting to the operating mechanisms the necessary power or energy and for controlling the operating speed independently of the speed or rate at which the power is applied. In the illustrated embodiment, operation is manually effected by means of a handle 67 but it will be understood that electrical or other power means could be substituted. The handle is suitably and preferably removably mounted for rotation with a rigid assembly comprising a plate or arm 68 and a stub shaft 69 (Fig. 4) which is journalled in a bushing in side frame member 61 and held in axially fixed position by a split ring engaging a groove in the shaft or by other suitable known means. Securely mounted on arm 68 and projecting inwardly through a suitable opening in side frame 61 is a pin or stud 70 through which power is transmitted to the operating parts during each forward or operating stroke of the handle, i.e. toward the operator as viewed in Figs. 1 and 4.

Rotatably journalled on shaft or rod 69 is a sleeve 77 formed integrally with an arm or sector 71 (Fig. 2) which has a notch or groove in the rear or right hand edge thereof to receive actuating pin 70 for purposes to hereinafter appear. Arm or sector 71 has an arcuate slot 72 therethrough and the outer arcuate edge-surface thereof is smooth at the forward end and provided with serrations or V-shaped notches 73 at the rear end portion thereof. Said edge-surface is adapted to cooperate with a spring-biased double acting pawl 74 that is pivotally mounted on a stud projecting from the inner face of frame member 61. When the parts are in normal or non-operating position, the full stroke sector 71 and pawl 74 assume the positions shown in Fig. 2, the pawl being biased counter-clockwise by spring 75. During the initial part of the operating stroke of handle 67 when the sector 71 is moved by pin 70 to the position shown in Fig. 7, pawl 74 rides on the smooth edge surface of the sector so that the parts are free to return to starting position if the handle is released. As will appear hereinafter, this feature is utilized to effect by operation of handle 67 the removal of an erroneous amount which has been set in the machine through the keyboard or the pin carriage controlled thereby.

Figure 8:
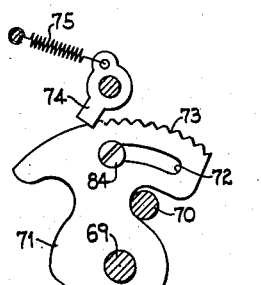
Figure 9:
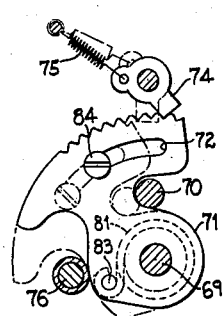
Figure 10:
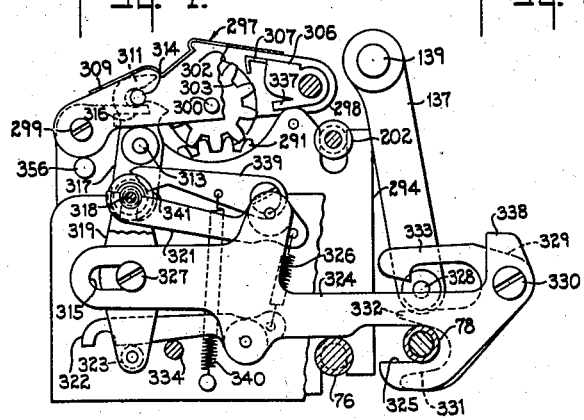
Fig. 10 is a fragmentary side elevation view, partly in section, showing the totalizer and actuating mechanism therefor in position for effecting a totalizing operation.

When, during the operating stroke of the handle, said pin 70 has proceeded to the point represented in Fig. 8, pawl 74 will engage a serration 73 and thereafter prevent any return movement of sector 71 and other parts operated thereby until the sector passes beyond the pawl, as shown in dot and dash lines in Fig. 9. In this position the sector has engaged a stop sleeve on a rod 76. Thus, once the pawl 74 engages the serrations 73, the cycle of operation thus commenced must be completed. It will be noted, however, that handle 67 and pin 70 are free for return movement at all times, thus eliminating any danger of introducing an error in the calculations or causing damage to the machine by a forced return stroke of the operating handle. On the return or clockwise movement of sector 71 after each operating stroke, pawl 74 is cocked in the opposite direction (as shown in Fig. 9) to engage serrations 73 in such manner as to prevent any subsequent full or partial effective operating or forward stroke of handle 67 or detrimental interference with the operating parts until the machine has completed the operating cycle for which it has been energized by the full forward stroke of handle 67.

Freely journalled on the tubular hub 77 of sector 71 is a sleeve 78 (Fig. 4) on which two radially extending arms 79 and 80 are rigidly secured in axially spaced relation for angular movement therewith. This sleeve and arm unit is connected to sector 71 through a yieldable torque transmitting connection which, as shown, comprises of a coil spring 81. The latter surrounds sleeve 78 between arms 79 and 80 and the opposite ends thereof engage axially extending pins or lugs 82 and 83 on arm 80 and sector 71, respectively. Extending between the outer ends of arms 79 and 80 is a pin or rod 84 whereby the motion of said arms may be transmitted to other operating end control parts. The right hand headed end of rod 84 extends freely through slot 72 in sector 71 and the space between the head on rod 84 and arm 79 is sufficient to permit free relative angular movement of said arm and sector to the extent permitted by the slot. The reduced ends of a spacer sleeve 86 fitted between arms 79 and 80 and surrounding rod 84 serve as bearings and provide suitable axial space for two links 87 and 88. Link 87 is a main operating link and has a slot 89 (Fig. 2) for receiving one end of the spacer sleeve, whereas link 88 is pivoted on the sleeve (Fig. 6) and constitutes part of a connection to a speed governing mechanism to be hereinafter described.

The threaded left end of rod 84 is operably engaged by a nut 90 (Fig. 4), the reduced cylindrical right hand end portion of which butts against arm 80 and serves as a pivot bearing and axial spacer for a link 91 (Fig. 6), hereinafter sometimes referred to as the pin carriage return arm. The other or left end of nut 90 is also reduced and forms an operating pin or stud 92, the function of which in connection with the totalizing or accumulating mechanism will be hereinafter described.

Sleeve 78 extends to the left (Fig. 4) beyond the end of shaft 69 and into abutting engagement with a bushing or bearing in inside frame member 63. Passing through said bushing and into sleeve 78 and secured to the latter by a pin or other suitable means is a stub shaft 93 to which is secured a cam 94 that performs a plurality of functions, as will hereinafter appear.

Certain of the above described parts may be returned to and yieldably held in non-operating position (Figs. 2 and 6) by a spring 96 connected between a fixed rod 97 or the like and a lug 98 on link 91. If desired, this spring may be connected directly to sector 71. During the initial portion of the return stroke of sector 71 from stop 76, said spring 96 is assisted by other resilient means to be later described.

Main operating linkage (Figs. 1, 2, 3, 11, and 17)

On the so-called forward or operating stroke of handle 67, a substantial portion of the operating parts of the machine are actuated by spring 81 which is under initial tension and functions as a yielding connection between the handle and the main operating parts of the machine in the manner heretofore described. In addition to actuating certain of the operating parts the operating stroke also effects a sufficient tensioning of other resilient means to supply the necessary energy for returning some parts to normal position and for actuating others on the return stroke. The chief resilient means for this purpose comprises a relatively heavy coil spring 129 (Figs. 1 to 3). The latter is coiled around a rock shaft 130 journalled at its ends in frame plates 61 and 63. One end of the spring engages a spacer sleeve on a tie rod 131 and the other end engages a pin 132 on a rocker arm 133 secured to shaft 130 for imparting oscillatory movement thereto. The clockwise angular movement of the rocker arm by the spring is limited by the sleeve on tie rod 131 (Fig. 2). The upper end of rocker arm 133 is pivotally secured to main operating link 87. Thus, on the counterclockwise or operating stroke of arms 79, 80 after cross pin 84 engages the left or forward end (Fig. 2) of slot 89 in link 87, the latter is moved to the left or forwardly, thereby rocking the arm 133 and shaft 130 counterclockwise to wind up spring 129 and to actuate and control certain of the main operating parts of the machine in a manner to be hereinafter described. It may be here noted that rod 84 does not engage the forward end of slot 89 during the forward stroke of handle 67 until about the time that pawl 74 engages a serration 73 on sector 71. The prior or initial portion of said stroke is utilized to pre-set some of the machine parts, such as by cam 94, in preparation for actuation or release for operation of other parts controlled by the main operating linkage, as will more fully appear as the description proceeds.

Rigidly secured to shaft 130 for oscillatory movement therewith is a crank 134 (Fig. 3), the lower forwardly extending portion of which is pivotally connected to a link 136. The forward end of said link is pivotally secured to the lower end of the right hand end arm 137 (as viewed in Fig. 1) of an oscillating arm assembly comprising depending end arms 137, 138 rigidly connected by a cross shaft 139 journalled in frame members 63, 64. Pivotally connected to the lower ends of arms 137 and 138 and extending rearwardly therefrom are two links 140 and 141, respectively. The latter are additionally connected to each other by two transverse bars 142 and 143 which function to actuate other parts of the apparatus in a manner to be hereinafter described.

Keyboard unit (Figs. 22 to 25)

Numerical data is put into the machine by means of digit and symbol keys mounted in a keyboard unit which is novelly constructed and combined with the remainder of the structure in such a manner that the same may be readily removed for purposes of inspection and repair without in any way affecting the normal operability of the machine. It is accordingly, an easy matter to obtain a full view of the operating parts of the machine in operation to thus facilitate discovery of the causes for operational failures. In the illustrated embodiment, the keyboard unit comprises an upper plate 150 and a lower plate 151 secured together in vertically spaced relation by four posts 152, 153, the lower plate being removably held in place by screws which threadedly engage said posts. Slidably mounted in this frame are ten digit keys and eight symbol or control keys, all shown in Fig. 22 with the finger buttons removed in the interest of clarity. The digit keys are indicated by numerals "0" to "9," inclusive, and the symbol or operational keys are identified as follows: non-print key 154, back spacer key 156, division key 157, subtraction key 158, repeat key 159, total key 160, sub-total key 161 and non-add key 162.

Each of the key members is made of a strip of metal comprising a shank 163 (Fig. 23) which supports a finger button 164 and slidably extends through a suitable guide slot in top plate 150. Between plates 150 and 151 each key member is divided and suitably contoured to form a leg 166 that slidably extends through a slot in lower plate 151 and a shorter leg 167 which is adapted to engage the lower plate to limit the downward movement of the key. Additionally, each of the ten digit key members has a horizontal arm 168 which over-rides a vertically movable cross-bar 169 and all except the "9" key has a pin operating leg 170 projecting downwardly through lower plate 151 from a horizontal arm, which in some instances is arm 168 or an extension thereof. A spring 171 surrounds each guide leg 166 and yieldably supports the key in inoperative position. Although the digit key members are all differently shaped between the frame plates, each has the same basic parts and the pin operating legs 170 thereof are all arranged in fore- and aft-alignment and in numerical sequence ("0" to "8") from front to back as indicated at 170, 170 (Fig. 22). The construction of each of the symbol or control keys will be more specifically hereinafter described when the coaction thereof with other parts of the structure is described.

Bar 169 is supported by a bail consisting of side arms 172, 172 and a cross-piece 173. Said bail is pivotally mounted on reduced portions of screws which have threaded engagement with and project through posts 153 (Fig. 22) and bar 169 rests by gravity upon an upwardly biased lever 174 (Figs. 15 and 23) of an escapement mechanism which controls the movement of a traveling stop-pin carriage to be next described.

*Traveling stop-pin carriage*

(Figs. 1, 2, 13, 14, 15 and 16)

Mounted below the keyboard for cooperation therewith and with the main operating parts of the machine is a traveling carriage 175 which is actuated and controlled in a novel manner and is novelly constructed to minimize the number of parts and thereby facilitate the assembly and disassembly thereof. In the specific form illustrated, said carriage comprises a frame (Fig. 13) consisting of a top plate 176 and a bottom plate 177 secured together and vertically spaced by side plates 178, 178. The forward ends of the latter are slotted and the rear ends thereof are perforated to receive tie rods 179 and 180, respectively, which extend between outside frame members 61 and 62 and support the carriage for reciprocating movement transversely of the machine below the keyboard.

The upper and lower plates of the stop-pin carriage frame have vertically aligned slots therein, arranged in transverse rows and longitudinal columns, there being nine pairs of vertically aligned slots in each row and column in the illustrated structure. Slidably mounted and guided in each said pair of vertically aligned slots is a stop pin 181. Each pin has two V-shaped notches in the right hand edge thereof, as viewed in Fig. 13, and oppositely facing shoulders on the left edge that engage plates 176 and 177 to limit the vertical movement of the pin.

Each pin 181 is yieldably held in one of its two limiting positions by novel resilient means. For each longitudinal column or row of pins 181 there is provided a single comb-like resilient member 182 (Fig. 14) that fits between adjacent longitudinal columns or rows of the pins and between right hand side plate 178 and the first row of pins on the right. Each resilient comb member 182 consists of a series of nine resilient tongs or fingers 183 with V-shaped end portions that normally engage the lower grooves or notches in the pins 181 and a solid portion 184 that yieldably engages the flat surfaces of the pins in the adjacent longitudinal row. Each resilient comb 182 may be readily removed by sliding it endwise from the carriage frame so that worn or defective springs may be readily replaced. The pins 181 in the front transverse row or line are adapted to be engaged and moved downwardly by the "0" key member to a position such that a spring finger 183 engages the upper notch in the pin and the lower end of the pin extends below lower plate 177 (dotted position 181a, Fig. 13). The pins in the next or second transverse row toward the rear are similarly operable by the "1" key, the next or third row by the "2" key and so on, the last or rear row being operable by the "8" key. Return or upward movement of a stop-pin 181 is effected by a cam surface 186 in a manner to be hereinafter described.

The stop-pin carriage is normally biased for movement toward the left side of the machine, as viewed in Fig. 1, by a spring 187 anchored to frame plate 62 (Fig. 1) and upper plate 176 adjacent the right hand edge thereof (Fig. 13). Movement of the carriage by the spring is controlled by an escapement mechanism comprising arm 174 pivotally mounted on a bracket projecting from frame plate 64 (Figs. 1 and 15) and biased in a counter-clockwise direction by a spring 188, as viewed from the front of the machine. The free end of arm 174 extends into a guide slot in frame plate 63 which limits the upward or counter-clockwise movement thereof. Pivotally mounted on arm 174 is a pawl 189, the free end of which is biased upwardly by a spring 190 to a limiting position determined by a lug 191 on arm 174. Said lug projects forwardly from arm 174 to the immediate left of the nose of pawl 189 for engagement thereby and the lug and pawl cooperate with a slotted member or rack 192 secured to horizontal ears on the rear edge portions of the carriage side plates 178 to control the step-by-step movement of the carriage toward the left, as viewed from the front. The teeth or prongs 193 of rack 192 project rearwardly from the carriage and corresponding surfaces thereof are transversely spaced to correspond with the transverse spacing of the longitudinal or fore-and-aft columns or rows of stop-pins 181. When escapement arm 174 is in normally raised position, the nose of pawl 189 extends into a notch between the teeth of the rack 192 and prevents movement of the carriage toward the left by spring 187. Whenever arm 174 is depressed by bar 169, which is in turn depressible by each digit key as heretofore described, the nose of the escapement pawl 189 will move below the rack 192, 193. Simultaneously, lug 191 will move into the notch vacated by the pawl, thus permitting the carriage to move slightly to the left into engagement with said lug. When arm 174 is now pivoted upwardly by spring 188 upon release of the digit key and bar 169, the carriage is released by lug 191 moving out of the rack notch, but movement of the carriage is shortly stopped again by pawl 189 which enters the next rack slot to the right under the tension of spring 190. Thus, as the digit keys and, hence, bar 169 are successively depressed and released, the carriage will be moved with a step-by-step movement to the left by spring 187 under the control of the escapement mechanism. The longitudinal or fore-and-aft columns of pins 181 are thus successively moved into vertical alignment with the row of stop-pin actuating legs 170 on the digit key members.

The lower ends of stop-pins 181 which have been depressed serve as stops for denominational slide racks to be hereinafter described. As pointed out above, the "9" key does not operate any stop pins, but rather only the bail bar 169 to effect a step movement of the stop-pin carriage 175. For stopping said slide racks in the "9" position, the rear edge of bottom plate 177 on the carriage has a depending stop flange 194.

Return or right hand movement of the stop-pin carriage 175 and tensioning of spring 187 is effected through the medium of a bell crank, an arm 196 of which is bifurcated or forked and straddles an upward extension of one of the screws whereby rack 192 is secured to the carriage (Fig. 1). Said bell crank is pivotally mounted on a horizontal bracket projecting from frame member 63 and the other arm 197 thereof extends toward the right from the pivot for engagement by the operating link 91 which, when moved rearwardly during the return stroke of handle 67 and sector 71 will actuate the crank to impart left-to-right movement to the stop-pin carriage as viewed in Fig. 1. During this return movement, the lower ends of any stop-pins 181 which have been depressed will operatively engage and be moved to normal or up-position by the inclined surface 186 on a laterally projecting lip 198 which is formed integrally with inside frame member 63 and functions as a cam. The left face of the nose of escapement pawl 189 is also tapered or inclined so that the teeth of rack 192 will be effective to depress the pawl against the efforts of spring 190 during the return movement of the carriage and rack.

Figure 6:
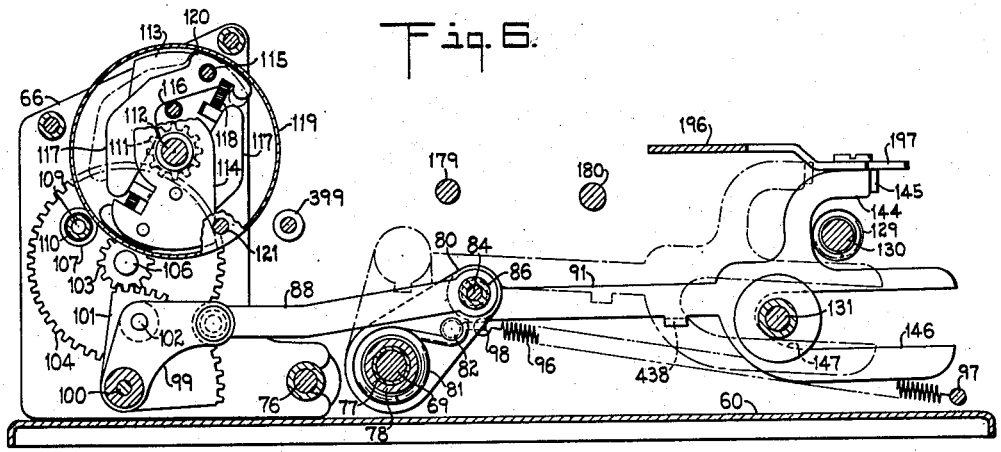
Fig. 6 is a vertical longitudinal sectional view substantially on the line 6—6 of Fig. 1.
Figure 7:
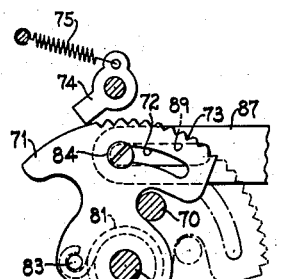
Figs. 7, 8 and 9 are detail side elevation views, partly in section, of the handle operated sector in different positions.

As above pointed out, link 91 is effective to actuate crank 196, 197 to return carriage 175 to the right, and for this purpose said link has an upper arm 144 with a right angle lug 145 which is engageable with the forward edge of crank arm 197. The rear or right hand end of pivoted link 91 is biased upwardly or counterclockwise by spring 96 to normally hold the upper edge of a lower arm 146 of the link in engagement with a sleeve on tie rod 131 (Fig. 6). The forward end portion 147 of said upper edge of arm 146 is tapered or curved forwardly and upwardly to function as a cam surface. Thus, when link 91 approaches the end of its rearward stroke and after the carriage 175 has been fully returned, surface 147 engages the sleeve or tie rod 131 and cams link 91 clockwise sufficiently to move upper arm 144, 145 downwardly out of engagement with carriage return crank arm 197. In this manner, link 91, 144 is so positioned as to not interfere with subsequent left hand movement of the pin carriage.

*Denominational slide rack assemblies*

(Figs. 1, 5, 16 and 42)

The figures and symbols entered in the machine through the medium of the keyboard and the stop-pin carriage are mechanically translated into the totalizing and printing mechanisms in a novel manner through a novel arrangement and assembly of slide racks and associated controls therefor. In the illustrated machine, there are nine identical denominational slide racks, each of which is fabricated from a plurality of parts including a printing rack member or slide 200 and a totalizer rack member or slide 201. The latter is supported in vertical or on-edge position and guided for straight line longitudinal movement by upper and lower circumferentially grooved rods 202 and 76, respectively, and one of a series of spool-like bushings 206 on the rod 131 that passes through a central elongated cut-out or slot 203 in rack member 201. The latter engages the reduced portion 204 between the flanges of the bushing 206 mounted on rod 131. The flanges of adjacent bushings 206 are spaced by a reduced hub portion 205 on one end of each bushing for a purpose to appear hereafter (Fig. 42). The forward end of rack slide 201 is bifurcated and the inner or adjacent surfaces of the furcations 207 and 208 are provided with gear teeth for a purpose which will appear hereinafter in connection with the description of the totalizing mechanism.

On the left side (Fig. 1) of each totalizer slide 201, a printing slide 200 is mounted for longitudinal movement therewith and limited movement relative thereto. The mounting or connection of the pairs of slides 200 and 201 is effected by two shouldered studs 209, the reduced portions or shanks of which are secured to slide 200 and ride in grooves 210 in rack member or slide 201. A tensioned spring 211 is connected at its left end (Figs. 16 and 42) to a downwardly extending lug 212 on slide 201 thereby exerting a force which tends to move the slides relative to each other to cause pins 209 to occupy the right hand ends of slots 210, as seen in Fig. 42. The upper surface of slide 200 is formed with a ledge or shoulder 213 for cooperation with stop-pins 181, a series of notches 214, in the central portion for cooperation with a locking member 216, and a series of gear teeth 217 for cooperation with a printing type quadrant 218 or 250, all in the manner and for purposes which will hereinafter appear. The upper surface of slide 201 has a shoulder 219 for cooperation with a detent 220 all in the manner and for purposes which will hereinafter appear.

As pointed out above, slide 200 is biased toward the right (Fig. 42) relative to slide 201 by spring 211 and both slides are additionally biased and movable toward the right by a spring 223 connected between a depending lug 224 on slide 200 and a fixed horizontal tie rod 226 mounted in the frame. Return or forward movement of the slide racks 200, 201 toward the left and tensioning of springs 223 is effected by main spring 129 acting through a linkage comprising horizontal cross bar 142 that extends through slots 203 and engages the rear vertical edges of the depending portions 227 of slides 200. As pointed out above, bar 142 is supported at its ends by a pair of identical links 140, 141 (Figs. 11 and 17) the rear or right hand ends of which are supported and connected by rod 143 that travels in and is guided by slots 228, 229 in the inside frame members 63 and 64, respectively. The forward or left ends of links 140, 141 are pivotally connected to the lower ends of the side arms 137, 138 of the oscillating arm assembly which includes horizontal rock shaft 139. The lower end of arm 137 is also pivotally connected to link 136 which is in turn pivotally connected to rocker arm 134 which oscillates with rock shaft 130 and, hence, with the double rocker arm 133 to which spring 129 is connected. Suitable slots or openings 230 are provided in frame members 63 and 64 to permit fore-and-aft movement of rack operating rod 142.

It will thus be seen that when main operating link 87 is moved forwardly and shaft 130 is rocked counter-clockwise (Figs. 2 and 3) during the forward or operating stroke of handle 67, the lower end of rocker arm 134 will move rearwardly and, hence, transmit rearward movement to bar 142 through link 136, arm 137, rock shaft 139, arm 138, and links 140, 141. This rearward movement of slide rack operating bar 142 releases rack assemblies 200, 201 for rearward movement under the influence of springs 223 and performs additional functions in connection with the control and actuation of other units of the machine as will hereinafter appear. The extent of the rearward movement of each rack 200, 201 upon release thereof by rod 142 is determined in a manner to appear hereafter in accordance with the figure or amount which has been set in the machine through the keyboard. Briefly, the rearward movement of the slide racks is determined by the position of stop-pin carriage 175 and any depressed stop-pins 181 which are engageable by shoulders 213 on rack members 200. When the forward stroke of handle 67 is completed and the parts are released by pawls 74 and 124 for the return stroke or movement, spring 129 becomes effective through the above linkage to return the rod 142 and, hence, slide racks 200, 201 to normal position (Fig. 16) and to thereby again tension springs 223.

*Slide rack movement control*

(Figs. 1, 4, 12, 16 and 17)

Before slide racks 200, 201 are released for rearward movement by movement of rack operating rod 142 to the rear on the operating stroke of the handle, suitable locking means are put in operation to prevent rearward movement of the slide racks in columns in which no digit has been set through the keyboard and stop-pin carriage. For simplifying the description and facilitating an understanding of the construction, let us assume that only the digit 5 has been set into the machine by depressing the "5" digit key. As previously explained, depression and release of the "5" key will move a stop-pin 181 to its lower or depressed position as indicated at 181a (Figs. 13 and 16). This will be the sixth stop-pin toward the rear in the first or left column of pins on the pin carriage 175. Upon operation of the digit key, the escapement mechanism functions to permit the carriage to move one step to the left (Fig. 1) so that the depressed pin 181a is moved into alignment with the first or right hand denominational slide rack 200 and in the path of shoulder 213 thereof.

Now, upon the subsequent initial forward movement of operating handle 67 and before operating rod 142 begins to move rearwardly, cam 94 (Figs. 4 and 12) rotates counter-clockwise with sleeve 78 and permits a link 231 normally supported by the cam to move downwardly under the influence of a spring 232 (Fig. 17). Link 231 is guided at its lower end by a headed stud 233 engaging a slot therein and is pivotally connected at its upper end by means of a pin 234 to a bail which consists of a transverse cross-bar 237 and rearwardly extending end ears 238 which pivotally support said bail on a shaft or tie-rod 239. The spring 232 is connected under tension between bar 237 and an upwardly biased element 240 to be later described.

Resting on bail bar 237 are a series of locking pawls 220 (Fig. 16), one for each slide rack. Said pawls are pivotally mounted on shaft 239 and each is individually biased in a counterclockwise direction by a bent spring 241 coiled around shaft 239 and having one end thereof secured to the pawl and the other end in operative engagement with the rock shaft 139. A forwardly extending arm of the pawl has a laterally off-set depending portion 242 adapted to move into the path of shoulder 219 of the slide rack 201 and prevent rearward movement of said rack. The end of arm 242 is preferably guided in the rack guide slots in rod 202. A downwardly and rearwardly extending arm 243 of each pawl 220 is adapted to engage the lower plate 177 of stop-pin carriage 175 when the latter has moved to the left into the path of said pawl arm. The pawls 220, 243 which thus engage the pin carriage are prevented from pivoting counter-clockwise into rack locking position, i.e. with arm 242 in the path of shoulder 219 when bail bar 237 is lowered.

It will thus be seen that when cam 94 is rotated to permit link 231 and bail 237 to move to down position (dotted line, Fig. 16), those pawls 220, 243 which are not held or stopped by the pin carriage plate 177 will be moved by springs 241 to rack locking position. Accordingly, under the conditions assumed above, the locking pawl 220 for the right hand digit rack 200, 201 will engage the carriage and leave said rack free to move rearwardly until the shoulder 213 thereof engages the depressed stop pin 181a (dotted lines, Fig. 16). All the other pawls 220, 242 will pivot counterclockwise into position to be engaged by shoulders 219 and thus lock the remainder of the slide racks 201 in normal position so the same cannot move rearwardly even when released by operating rod 142. Near the end of each cycle of operation, after rod 142 and racks 200, 201 have been returned to their forward positions, cam 94 is effective to lift arm 231, bail 237 and, hence, all of the rack locking pawls 220, 242 to non-locking position (full lines, Fig. 16) in readiness for the next cycle of operation and to permit movement of the stop-pin carriage to the left.

*Printing mechanism*

(Figs. 1, 5, 11, 16, 17, 19, 20 and 21)

The invention comprehends a novelly constructed simplified mechanism which functions in a novel manner with a minimum number of parts to effect so-called hammer-blow printing of the figures and symbols entered in the machine. In the form illustrated, said printing mechanism comprises ten numeral type quadrants 218 and a symbol type quadrant 250, each individually mounted for oscillation on a bodily movable pivot 251. An arcuate portion or segment of each quadrant 218 concentric with said pivot is provided with gear teeth 252 in constant mesh with the teeth 217 on a rack slide 200 (Fig. 16). To each quadrant 218 there is secured an arcuate type bar or strip 253 each bearing in sequence, from top to bottom, the numerals "0" to "9," inclusive. On quadrant 250 the type bar or strip has various symbols designed to assist the operator in interpreting the printed figures. In all other respects quadrant 250 is identical with and functions in the same manner as quadrants 218.

The pivot 251 for each type quadrant 218 is mounted on and carried by the upwardly extending arm of a bell-crank member 254 journalled for pivotal movement on the reduced hub portion 205 of one of the spools or bushings 206 on fixed rod 131. Each said crank 254 is biased for pivotal movement in a clockwise direction (Fig. 16) by a spring 256 anchored to a stationary rod 257 or a pin 258. Means in the form of a rake or comb 259 are provided for holding crank members 254 against clockwise movement by springs 256 until the type quadrants 218 have been pivoted counter-clockwise (Fig. 16) about pivots 251 to desired pre-printing positions determined by the rearward movements of the racks 200 in mesh therewith. Said comb 259 extends transversely across the machine between the frame members 63, 64 and is pivotally mounted at its ends on a fixed rod 260 mounted in said frame members. Said rod has axially-spaced, circumferential grooves 262 in which the upper forward ends of cranks 254 are guided. The rear edge of comb 259 is slotted to form a series of teeth 261, the ends of which are bent downwardly to hook over the upper rear edges of cranks 254 and thereby releasably lock the latter in normal position (full lines, Fig. 16).

The means for actuating comb 259 to release cranks 254 comprises a bell crank pawl 263 (Fig. 17) pivotally mounted on a rod 264 and having a rearwardly extending arm with a laterally extending lug 266 adapted to engage a downwardly facing ledge 267 on a link 268. The latter is pivotally mounted on comb 259 eccentrically with respect to pivot 260 and is biased in a clockwise direction by a spring 269 to thereby yieldably hold link 268 in engagement with lug 266 on pawl 263 and yieldably hold comb 259 in locking position. Pawl 263 has a forwardly extending arm 270 engageable by rack operating rod 142 during the forward movement of the latter and a downwardly extending arm 271 engageable by rod 142 during the latter portion of the rearward movement thereof in the manner heretofore described. Thus, when rod 142 is moved to the rear, it engages arm 271 and imparts counter-clockwise movement to pawl 263. The lug 266 on the pawl engages ledge 267 and lifts link 268, thereby pivoting comb 259 to non-locking position (dotted line position in Fig. 16) and releasing all the type quadrant supporting cranks 254. Each type quadrant which has been moved to a pre-printing position, such as dotted line position A, by a rack slide 200 in accordance with data entered into the machine, will now be carried by a crank 254 under the influence of a spring 256 into printing position B. Sufficient clearance is provided between the meshing teeth on the rack slides 200 and quadrant gear segments 252 to compensate for the small arcuate movement of pivots 251. The desired numeral or symbol on a strip 253 is thus snapped into engagement with an inked ribbon overlying a paper strip on a suitable platen 272 to be hereinafter described.

Those type quadrants which have not been moved to a pre-printing position by rearward movement of their cooperating slide racks 200 are held against rearward movement toward the platen in a novel manner by other locking means controlled by said rack slides 201. As shown, said other locking means comprises the series of overlapping hook members of detents 222 which are pivotally mounted on the transverse stationary bar 264 and may depend upon gravity for their operation in a clockwise direction toward operative locking position (Fig. 16). Each hook member 222 comprises laterally spaced rearwardly extending arms 273 and 274 (Figs. 19 to 21). Arm 273 is in the form of a downwardly facing hook which rides on and operatively engages a pin 276 secured to and extending laterally to the left (Fig. 1) from a crank 254 to hold the latter and, hence, the type quadrant 218 mounted thereon against movement to printing position B by a spring 256 when comb 259 is moved to unlocking position to otherwise release cranks 254. A cam lug 277 extends downwardly from arm 273 into cam groove 221 in the upper surface of rack slide 201 so that, when said slide moves rearwardly with its associated slide 200 to actuate a type quadrant 218 into a pre-printing position A, cam lug 277 will ride out of notch 221 onto the upper edge of slide 201 and thereby lift hooked arm 273 out of the path of pin 276. The crank 254 on which said pin is mounted will then be free to move the type quadrant 218 thereon from pre-printing position A to printing position B upon release of said crank by locking comb 259. Part of the upper edge portion 278 of each rack slide 201 is offset toward the right to provide a better track for detent lug 277.

The novel construction of the present machine is such that upon the initial rearward movement of bar 142 during each cycle of operation, each rack slide 200 is moved rearwardly by springs 211 and 223 through a distance determined by the pin and slot connections 209, 210 to thereby move each type quadrant to "0" pre-printing position, independently of whether or not its companion slide 201 is locked against rearward movement by a pawl 220, 242. For each column in which the operator has not set a numeral larger than "0," there will be no further rearward movement of either slide of the denominational rack assembly 200, 201 and the slide 201 thereof will not therefore be effective to lift the detent or hook member 222 associated therewith to non-locking position. The detents 222 are accordingly novelly constructed and interlocked in such a manner that all said detents to the right (Fig. 1) of the detent in the left-most column in which the operator has set a numeral or digit greater than "0" will be moved to non-locking position, thereby freeing the corresponding cranks 254 and the quadrants 218 thereon for movement to printing position. Thus, in each column to the right of the left-most digit wherein a digit greater than "0" has not ben set, the machine will print a "0." To accomplish this result, the right-hand arm 274 of each locking hook or detent 222 has a laterally offset end portion 279 which extends to the right beneath and engages the lower surface of the left-hand arm 273 on an adjacent detent 222. Thus, when one detent is lifted to non-locking or inoperative position by rearward movement of a slide 201, all said detents to the right thereof (Fig. 1) will also be correspondingly lifted to non-locking position independently of any rearward movement of the slides 201 associated therewith. In columns to the left of the left-most digit set in the machine, the detents 222 will remain in locking position and thus hold the corresponding type quadrants against movement to printing position.

The type quadrant operating cranks 254 are returned to normal position by the forward movement of main operating bar 142. For this purpose each crank 254 has a forwardly extending arm 280 with an inclined or cam surface 281 which moves upwardly into the return path of bar 142 when the crank members pivot clockwise to printing position. Thus, when the operating bar 142 is moved forwardly, it first disengages arm 271 of locking pawl 263 thereby freeing link 268 and comb 259 for movement to normal or locking position by spring 269. The force of the latter is also exerted through shoulder 267 and lug 266 to pivot pawl 263 clockwise (Fig. 17). Further clockwise movement of said pawl 263 is thereafter effected by engagement of bar 142 with the lower edge of arm 270 on the pawl. Following the release of pawl 263, bar 142 engages cam surfaces 281 on crank arms 280 and pivots cranks 254 in a counter-clockwise direction (Fig. 16) a sufficient amount to permit locking comb 259 to be snapped into locking position by spring 269.

In order to guard against possible movement of rack slides 200 while the type quadrants are in printing position against the platen 272 and to insure accurate horizontal alignment of the numerals printed by the type quadrants when in printing position, means are provided for locking and aligning said racks during movement of the type quadrants into printing position. As shown herein said means comprises the locking comb 216 made up of a transverse cross-bar with spaced forwardly and downwardly projecting teeth 282 and end arms 283 and 284 (Figs. 5, 11 and 17). The latter are pivotally mounted on frame plates 63 and 64, respectively, by means of eccentric screws 286 for purposes of adjustment and are biased clockwise to non-locking position by two springs 287. Each of the arms 283 and 284 extends downwardly and forwardly from its pivot and terminates in an inclined surface 288 in the path of rack operating bar 142. Near the end of its rearward stroke prior to its engagement with pawl arm 271 to release the type quadrants for movement to printing position, bar 142 rides up on the forward ends of arms 283 and 284 and pivots the same counter-clockwise. This brings aligned teeth 282 into firm engagement and mesh with notches 214 on the slide racks 200 to properly align the said racks and positively hold the same against movement during actuation of the type quadrants 218.

*Non-print mechanism*

(Figs. 1, 17, 22 and 25)

When the listing of one or more of the numbers set in the machine is not desired, the printing mechanism may be rendered inoperative, without affecting the operation of the totalizer mechanism, by depressing a non-print key 154 at the upper left corner of the keyboard. The shank or leg 446 of said key which extends downwardly through the lower plate 151 of the keyboard frame is adapted to engage and depress the forward end of an arm 447 which is part of link 268 and holds the latter out of position for engagement by pawl 263, 266. As heretofore described, said pawl normally engages link 268 to lift the same for pivoting locking comb 259 to inoperative position, thereby releasing cranks 254 for moving the type quadrants 218 to printing position. Accordingly, when link 265 is maintained out of engagement with pawl 263 the locking comb 259 will remain in locking position and the printing mechanism cannot operate. The shank of key 154 is provided with a notch 448 for locking the key in depressed position, if this is desired, during a plurality of successive operating cycles.

*Symbol control*

(Figs. 1, 12, 16, 17, 22, 26, 27, 28, 31, 32, 33, 38 and 39)

In order to assist the operator in identifying the figures and calculations on the list printed on tape 488, novel means are provided for controlling and effecting the printing of symbols on the tape following the numerals to indicate totals (*), sub-totals (ST), numbers not added (#), numbers subtracted (—), and numbers subtracted in making a calculation in division (÷). The printing of the above indicating symbols is effected by the symbol type-quadrant 250 which is like the digit type-quadrants 218 and is operated, guided and controlled in like manner by like parts, except that the symbol slide rack 500, 501 (foreground, Fig. 16) and the stops for determining the rearward movement of said rack differ from digit slide racks 200, 201 (Figs. 5 and 42; background Fig. 16) and the stop means therefor in a manner to be next described. A further exception is that the locking detent 222 associated with symbol rack 500, 501 is not interlocked or overlapped with the adjacent detent 222 to the left thereof in the manner that said detents associated with racks 200, 201 are interlocked by arms 279 as described above (Figs. 19–21).

The symbol slide rack 500, 501 may be made up by fastening together with rivets 502 or the like two of the slides 200 and 201 used in fabricating the digit slide racks, thereby making it unnecessary to use a spring 211 on the symbol rack. The toothed furcations at the forward or tabulating end of the rack 500, 501 are cut short, as seen in Fig. 16, to terminate at 503 and the upwardly extending shoulder 213 is removed to prevent interference with the rearward or right hand movement of the symbol rack slide 501. Integral with slide 501 is a tab 504 which engages a stepped stop arm 506 (Figs. 12 and 39) to variably limit the rearward movement of the symbol rack and determine the pre-printing position to which the symbol type-quadrant 250 is moved by said rack. Stop arm 506 is pivotally mounted on a fixed axis 507 and has an upwardly extending arm 508 which has pivotal connection with a longitudinally extending bar 509. The latter is biased forwardly and arm 506 is biased counter-clockwise by a spring 510.

The forward end of bar 509 is pivotally connected at 511 to the lower end of a lever 512 that is in turn pivotally mounted on rod 239 and extends upwardly therefrom (Fig. 39). Also pivotally mounted on rod 239 is an arm 513, the upper end of which has a tab 514 extending to the left (Figs. 12 and 26) for engagement with the rear edge of the upper rounded edge of lever 512. A pin 516 mounted on lever or arm 513 and extending laterally toward the right from the upper end thereof is adapted to fit into a downwardly facing open slot 517 in the lower edge of a symbol selector bar 518 (Fig. 31). The latter comprises a straight bar portion slidably mounted on the pins 378 between key lock slide 377 and frame posts 152, 152 and a rearwardly bent portion 519 in the lower edge of which pin groove 517 is formed and to which a biasing spring 520 is connected (Fig. 22).

The upper edge of slide or bar 518 is grooved or slotted below each of the total, sub-total and non-add keys and the forward edges of said grooves are tapered to cooperate with the same tabs on said keys which cooperate with the locking teeth 381, 427 and 444 on key lock slide 377 as heretofore described. Said cooperating tapered surfaces on slide 518 are of different extents so that the non-add key 162, when depressed, will cam the slide 518 forwardly only a short distance, sub-total key 161 will move it a slightly greater distance in the same direction, and the total key 160 will move it a still greater distance forwardly. These movements of slide 518, the amount depending upon which key is depressed, are transmitted through pin 516 to impart counter-clockwise movement to arm 513. Lug or tab 514 on the latter engages the upper rounded end of lever 512 and accordingly pivots it counter-clockwise to thereby move bar 509 rearwardly and pivot the stepped stop arm 506 of crank 506, 508 in a clockwise direction.

The uppermost forward tip of arm 506 is engaged by tab 504 and serves to limit the rearward movement of symbol rack 500, 501 when no symbol is to be printed (Figs. 12 and 31). When the non-add key 162 is depressed (Fig. 38), arm 506 is pivoted sufficiently to bring the first (from the top) step or shoulder thereof into the path of tab 504 to thereby permit symbol rack 500, 501 to move further to the rear for lifting the symbol type quadrant 250 a sufficient amount to print the non-add symbol (#). Depression of the sub-total key 161 (Fig. 33) moves the next lower or second step of the arm 506 into operative position, and depression of the total key 160 (Fig. 32) lifts said arm still more to bring the third step into operative position and permit corresponding greater rearward movements of symbol slide rack 500, 501 to effect proper positioning of the symbol type quadrant 250 to print the sub-total (ST) and total (*) symbols, respectively.

Further clockwise movement of stop arm 506 to bring the fourth and fifth steps thereof into operative position is effected by depression of the division and subtraction keys, respectively, through the medium of a bail 521 pivotally mounted on rocker shaft 139. The left end arm 522 of said bail has a forwardly extending tapered portion (Figs. 16, 27 and 28) which engages the upper surface of a V-shaped notch 523 in the upper rear edge of bar 240 which is moved downwardly different distances by depression of the division and subtraction keys as heretofore described. Downward movement of bar 240 depresses end arm 522 and effects clockwise (Fig. 17) pivotal movement of bail 521. The right hand end arm 524 of said bail is shaped to engage a laterally extending pin 526 mounted on lever 512 forwardly and upwardly from pivot bar 239 (Figs. 12 and 39). As the bail turns clockwise, it will effect counter-clockwise movement of lever 512, rearward movement of bar 509 and clockwise movement of stepped stop arm 506 to position the fourth and fifth (from the top) steps thereof in operating position to stop rack 500, 501, the position depending upon whether the division key 157 or the subtraction key 158 is depressed. Arm 524 of bail 521 has a rearward projection 527 which moves downwardly into the path of tab 514 on arm 513, thereby preventing forward movement of symbol slide bar 518, 519 and, hence, preventing depression of the non-add, sub-total, and total keys when either the division key or subtraction key is depressed.

*Platen, ribbon-feed and paper-feed assembly*

(Figs. 1, 3, 12, 16, 17, 39 and 46 to 51)

Novelly combined with the above described apparatus is a platen assembly embodying novel means for feeding an inked ribbon and for locking the platen against movement during the printing operation. In the illustrated embodiment, said assembly comprises a frame consisting primarily of side plates 530 and 531, a front end plate 532 and a bottom plate 533, all suitably rigidly secured together by screws or the like and adapted to be removably secured to the rear edges of frame plates 61 and 62 (Figs. 46 to 51). The shaft of the platen 272 having a rubber or other suitable surface is journalled in side plates 530, 531 and has a ratchet wheel 534 mounted thereon for rotation therewith.

Pivotally mounted on the hub of ratchet wheel 534 is a pawl carrier 536 that extends downwardly and pivotally connects with a link 537, the forward end of which extends through plate 532 and is pivotally connected to crank arm 134 by an eccentric pin 538 (Fig. 3). Pivoted on a stud 539 on lever 536 is a ratchet pawl 540 that is biased by a spring 541 toward operative engagement with ratchet wheel 534. The lower edge of pawl 540 has a shoulder 542 adapted to engage a pin or stud 543 on frame plate 530 to effect counter-clockwise movement of the pawl and, hence, disengagement thereof from wheel 534 at the end of the forward movement of the pawl. The platen 272 is thus freed for rotary movement in either direction by handles 544, 545 on the ends of the platen shaft, but such movement is yieldably resisted by an indexing arm assembly comprising a pivoted arm 546 and a roller 547 mounted thereon and held in engagement with ratchet wheel 534 by a spring 548. The lower end 549 of arm 546 extends into the path of lever 536 for engagement thereby at the very end of the rearward stroke of said lever. A counter-clockwise force or torque is thus applied to arm 546 by lever 536 to firmly press roller 547 into engagement with ratchet wheel 534 and hold platen 272 firmly against movement when the type quadrants 218, 250 strike the same.

Thus, on each operating stroke of handle 67, the crank 134 is actuated in the manner fully described above and moves link 537, the lower end of arm 536 and pawl 540 to the right or toward the rear. Pawl 540, as it moves away from pin 543, is pivoted by spring 541 into engagement with ratchet wheel 534 and lever 536 presses against the lower end 549 of arm 546 to urge roller 547 into firm engagement with said wheel. On the return stroke, pawl 540 is effective to index the platen one tooth of the ratchet and thereafter shoulder 542 thereon engages stud 543 to effect disengagement of the pawl from the ratchet wheel. This is repeated during each cycle of operation of the machine.

Paper tape 488 from a roll 550 is fed between platen 272 and a curved guide 551, the latter of which is transversely slotted to permit a pressure roller 552 to press the paper strip against the platen. Roller 552 is rotatably journalled on spaced arms 553 pivoted on a bar 554 and biased clockwise by a spring 556. As the platen is indexed by pawl 540 or manually, the paper strip is fed around the platen. A pivoted bail 557 is provided for temporarily moving pressure roll 552 away from platen 272 to permit free movement of paper strip 488 by hand.

An inked ribbon 558 is indexed or fed from one spool 559 to another spool 560, the same being guided and supported to extend across the front face of platen 272 by a vertically movable ribbon guide plate 561.

There is thus provided an extremely compact and versatile calculating and printing machine wherein a relatively small number of parts have been assembled in various novel combinations which function in novel combination with each other. The various elements of the machine are designed and assembled with a view to facilitating assembly as well as inspection and repair of the machine. The machine is small and readily portable, it is capable of performing a wide variety of mathematical calculations and is adapted for operation by an inexperienced operator without extensive instruction. The parts of the machine may be readily and inexpensively manufactured and assembled by known manufacturing processes.

In the foregoing specification and in the claims which follow, the terms used for describing the direction of the movements and the relative locations of the various parts of the machine and the movements thereof, should be broadly construed, the specific terms used herein having been selected in the interest of clarity and ease of understanding. For example, the terms "upper," "lower," "forward" and "rearward" as used in the claims should be construed merely as identifying different relative locations or directions of movement. Likewise, it will be understood that the terms used in identifying and distinguishing many of the parts and sub-assemblies of the machine may be equally as well known in the art by other terms.

Although only a single embodiment of the invention has been illustrated and described, it is to be expressly understood that the invention is not limited thereto but that various changes, particularly in the design and arrangement of the parts shown, may be made without departing from the spirit and scope of the invention as it will now be understood by those skilled in the art.

What is claimed is:

1. In apparatus of the class described, a plurality of longitudinally movable slide rack assemblies each comprising a pair of slides consisting of a first slide and a second slide, means for securing the slides of each pair together for limited longitudinal movement relative to each other, resilient means connected between the slides of each pair and tending to hold each of said assemblies in longitudinally extended condition, spring means connected to each said second slides and tending to move said assemblies rearwardly, actuating means for moving said slides forwardly to and releasably holding the same against rearward movement from a pre-determined normal position, releasable locking means for holding each of said first slides against rearward movement from said normal position, and a plurality of pivotally mounted type quadrants each having a toothed segment, each of said second slides having gear teeth thereon in mesh with a said segment, whereby each of said second slides is movable rearwardly relative to the first slide secured thereto to the limited extent permitted by said securing means when said slides are released by said actuating means while said locking means are in operative position to lock said first slides against rearward movement from said normal position to thereby actuate a said quadrant to a pre-printing position.

2. Apparatus as defined in claim 1 comprising means for selectively releasing one or more of said locking means and means for selectively controlling the extent of the rearward movements of the released slide rack assemblies when the same are released by both said actuating means and said locking means.

3. Apparatus as defined in claim 2 comprising a pivoted crank for pivotally supporting each of said type quadrants, resilient means urging each of the crank-quadrant units toward printing position, and releasable locking means for normally holding said cranks against movement toward said printing position.

4. Apparatus as defined in claim 3 comprising normally operable locking means for releasably locking each said crank in normal position, said last-named locking means for each said crank being movable to non-locking position by a said first slide upon rearward movement of the latter from its pre-determined normal position.

5. Apparatus as defined in claim 3 comprising normally inoperative means movable to operative position in engagement with said second slides for locking the latter against movement during movement of said cranks from normal to printing position.

6. In apparatus comprising a printing platen, the combination of a pivotally mounted crank, a type-carrying quadrant pivotally mounted on said crank, resilient means connected to said crank under tension and tending to pivot said crank to move said quadrant into engagement with said platen, releasable locking means engaging said crank for holding the same in normal position against pivotal movement by said resilient means, a rack slide unit having teeth meshing with a toothed segment on said quadrant and being movable to pivot said quadrant relative to said crank to selective pre-printing positions, other locking means normally operative for releasably holding said crank in said normal position, said other locking means being movable to non-locking position in response to movement of said rack slide unit while moving said quadrant into a pre-printing position, and means for releasing said releasable locking means independently of the position of said other locking means.

7. In apparatus comprising a printing platen, the combination of a pivotally mounted crank, a type-carrying quadrant pivotally mounted on said crank, resilient means connected to said crank under tension and tending to pivot said crank to move said quadrant into engagement with said platen, releasable locking means engaging said crank for holding the same in normal position against pivotal movement by said resilient means, a rack slide unit having teeth meshing with a toothed segment on said quadrant and being movable to pivot said quadrant relative to said crank to selective pre-printing positions, normally inoperative locking means for said rack slide unit, and means for moving said last-named locking means into operative position after said rack slide unit has moved said quadrant to a pre-printing position to thereby hold said rack slide unit against movement while said crank is pivotally actuated by said resilient means to move said quadrant into printing position against said platen.

8. Apparatus as defined in claim 7 wherein said normally inoperative locking means comprises means engageable with one of a plurality of notches in the rack slide unit.

9. In apparatus comprising a printing platen, the combination of a plurality of adjacently mounted crank-quadrant assemblies each including a pivotally mounted crank and a type-carrying quadrant pivotally mounted on said crank, resilient means connected to each said crank under tension and tending to pivot said crank to move the quadrant mounted thereon into engagement with said platen, releasable locking means common to all said cranks and engaging the latter for holding the same in normal position against pivotal movement by said resilient means, a plurality of rack slide units each having teeth meshing with a toothed segment on a said quadrant and being movable to pivot said quadrant relative to the crank on which the same is mounted to selective pre-printing positions.

10. Apparatus as defined in claim 9 comprising other locking means including a pawl engageable with each crank for releasably holding said crank in normal position, each of said pawls being movable to non-locking position by a said rack slide unit.

11. Apparatus as defined in claim 10 wherein each of said locking pawls has a portion underlying an adjacent pawl at one side thereof, whereby movement of a given pawl to non-locking position is effective to move all other pawls on one side of said given pawl to non-locking position independently of any movement of the rack slide units associated with said other pawls.

12. In apparatus of the class described, printing apparatus comprising a type carrying member, means including a slide for selectively moving said member to one of a plurality of positions prior to movement thereof into printing position, and means for controlling the movements of said slide comprising a pivotally mounted crank having one arm thereof stepped, and means on said slide adapted to engage the steps on said arm to limit the movement of said slide in one direction, and operating means for pivoting said arm to selected positions to bring different ones of said steps into the path of said means on the slide, whereby said slide is stopped by said arm in different positions depending upon the position of said arm.

13. Apparatus as defined in claim 12 wherein said operating means includes a pivoted lever, a link connecting an end of said lever and the other arm of said crank, and actuating means for selectively pivoting said lever through different angles to selectively position said stepped arm.

14. Apparatus as defined in claim 13 wherein said actuating means comprises a spring-biased, linearly-movable slide bar having an inclined surface thereon, means operatively connecting said bar to said lever, and a depressible key engageable with said surface to actuate said slide bar.

15. Apparatus as defined in claim 14 wherein said connecting means between said slide bar and lever comprises a pivotally mounted pawl having a portion engageable with the other end of said lever and a pin projecting from said pawl into operative engagement with said slide bar.

16. Apparatus as defined in claim 14 wherein said slide bar has a plurality of inclined surfaces of different extents, and comprising a plurality of keys each engageable with a said surface for moving the slide different distances to effect different movements of said stepped stop arm.

17. Apparatus as defined in claim 14 wherein said actuating means comprises a pivoted arm engageable with said lever for actuating the latter beyond the position to which the same is movable by said slide bar, said pivoted arm having means thereon for holding said slide bar in normal biased position.

18. Apparatus as defined in claim 13 wherein said actuating means comprises a pivoted arm engageable with said lever to effect pivotal movement of the latter.

19. Apparatus as defined in claim 18 comprising means for actuating said pivoted arm including a linearly movable element having a recess therein, a second pivoted arm connected with said first-named pivoted arm and extending into said recess, and at least one depressible key for moving said element to impart pivotal movement to said pivoted arms for actuating said lever.

20. Apparatus as defined in claim 13 wherein said printing apparatus includes an inked ribbon, means for transversely shifting an operative portion of said ribbon, said means comprising a shiftable plate supporting the ribbon and having a projection thereon, and means engageable with said projection for shifting said plate, said last-named means including an element controlled by said link.

21. Apparatus as defined in claim 20 comprising a pivoted operating arm pivotally supporting said element, and means on said element guided in a slot in said link during movement of said element by said operating arm, whereby said element operatively engages or does not engage said projection during movement thereof by said operating arm depending upon the position of said link and the guide slot therein.

22. In apparatus of the class described a rotatable platen, means for indexing said platen including a ratchet wheel, pawl means engageable with said wheel and means for operating said pawl means, and means engageable with said ratchet wheel for normally yieldably resisting movement thereof and engageable by said pawl operating means to press and hold the same immovably against said wheel and thereby positively lock the platen against movement.

23. In apparatus of the class described, a rotatable printing platen, means for indexing said platen including a ratchet wheel secured to said platen, a ratchet pawl operably engageable with the ratchet wheel and cyclically operable means for actuating said pawl, and means normally engaging said wheel for yieldably holding the platen against rotation and engageable by said pawl actuating means, the latter being operable during each cycle of operation thereof to first actuate said pawl to index the platen and to thereafter engage said wheel engaging means to render the latter effective to hold the platen immovable.

24. In apparatus of the class described, a rotatable printing platen, means for indexing said platen including a ratchet wheel secured to the platen, a ratchet pawl operably engageable with the ratchet wheel and means for actuating said pawl, means normally engaging said wheel for yieldably holding the platen against rotation and engageable by said pawl actuating means to positively hold the platen against movement, type bars movable to strike said platen, control means for releasing said type bars for movement to strike said platen, and common means for operating said control means and said actuating means in timed relation whereby said platen is held immovable by said wheel engaging means when the platen is struck by said bars.

25. In apparatus comprising a printing platen, the combination of a pivotally mounted crank, a type-carrying quadrant pivotally mounted on said crank, resilient means connected to said crank under tension and tending to pivot said crank to move said quadrant into engagement with said platen, releasable locking means constituted by a pivotally mounted member engaging said crank for holding the same in normal position against pivotal movement by said resilient means, a link pivotally mounted on said member, resilient means connected to said link for biasing said member to locking position, means for moving said member to non-locking position, means including an element operably engageable with said link, and means for moving said link out of position for operative engagement by said element to thereby render the latter incapable of releasing said locking means.

References Cited in the file of this patent

UNITED STATES PATENTS

| | | |
|---|---|---|
| 1,829,461 | Sundstrand | Oct. 27, 1931 |
| 2,076,713 | Ford | Apr. 13, 1937 |
| 2,081,836 | Racz | May 25, 1937 |
| 2,100,213 | Garbell | Nov. 23, 1937 |
| 2,103,098 | Slettevold | Dec. 21, 1937 |
| 2,165,922 | Garbell | July 11, 1939 |
| 2,251,097 | Anderson | July 29, 1941 |
| 2,418,027 | Gubelmann | Mar. 25, 1947 |
| 2,497,264 | Klosterman | Feb. 14, 1950 |
| 2,503,865 | Christian | Apr. 11, 1950 |
| 2,510,626 | Geisheck | June 6, 1950 |
| 2,536,267 | Davidson et al. | Jan. 2, 1951 |